United States Patent [19]
Fujisawa et al.

[11] Patent Number: 5,356,088
[45] Date of Patent: Oct. 18, 1994

[54] TAPE SPEED CONTROL SERVO WITH AN OVERRIDING SLACK TAKEUP CAPABILITY FOR A STREAMING CASSETTE TAPE TRANSPORT

[75] Inventors: Shinobu Fujisawa, Akishima; Kazuhiko Nakagawara, Mitaka, both of Japan

[73] Assignee: TEAC Corporation, Tokyo, Japan

[21] Appl. No.: 979,639

[22] Filed: Nov. 20, 1992

[30] Foreign Application Priority Data

Nov. 29, 1991 [JP] Japan .................. 3-340241
Nov. 29, 1991 [JP] Japan .................. 3-340242

[51] Int. Cl.5 .......................... B65H 23/192
[52] U.S. Cl. .................. 242/334.4; 242/340
[58] Field of Search .......... 242/186, 190, 191; 318/7

[56] References Cited

U.S. PATENT DOCUMENTS

| | | | |
|---|---|---|---|
| 3,488,696 | 1/1970 | Klang | 242/190 |
| 3,669,382 | 6/1972 | Struzina | 242/186 |
| 3,914,668 | 10/1975 | Okamoto | 318/7 |
| 4,163,532 | 8/1979 | Sakai | 242/186 |

Primary Examiner—Daniel P. Stodola
Assistant Examiner—John Q. Nguyen
Attorney, Agent, or Firm—Woodcock Washburn Kurtz Mackiewicz & Norris

[57] ABSTRACT

A cassette tape transport has a tape speed control servo for driving either of a pair of tape drive motors at constant speed in response to tape speed pulses from a tape speed sensor. Upon development of a tape slack, as manifested by a decrease in the recurrence rate of the tape speed pulses, the tape speed control servo is overridden, and the pair of drive motors are simultaneously energized for rotating the cassette reels in opposite directions, thereby stretching the tape between the reels until the slack is removed. The tape transport has a microcomputer which may be factory preprogrammed to include a slack takeup routine. The microcomputer starts the slack takeup routine not only upon decrease in the recurrence rate of the tape speed pulses but also when the tape cassette is loaded in the tape transport and when no tape speed pulse is produced for a predetermined length of time.

6 Claims, 6 Drawing Sheets

TAPE SPEED CONTROL SERVO WITH AN OVERRIDING SLACK TAKEUP CAPABILITY FOR A STREAMING CASSETTE TAPE TRANSPORT

BACKGROUND OF THE INVENTION

This invention relates generally to magnetic tape transports, sometimes referred to as tape units, tape drives, tape decks, etc., for use with a replaceable tape cassette or cartridge, and particularly to those used as a subsystem to enable a host system to obtain access to data on magnetic tape. More particularly, the invention concerns a method of, and means for, automatically taking up a slack that may develop in the tape it, during its travel in a cassette tape transport under the control of a tape speed control servomechanism.

Cassette tape transports, particularly to those operating in streaming mode, as contrasted with start/stop mode, have come to find extensive use as peripherals of computer systems. U.S. Pat. No. 4,163,532, filed by Sakai and assigned to the assignee of the instant application, discloses one such streaming cartridge tape transport, or streamer, which bears particular pertinence to the present invention. This prior art streamer comprises a pair of reel motors for bidirectionally driving the pair of reels of an associated tape cartridge under the direction of a motor control circuit forming a part of a tape speed control servo. Also included in the tape speed control servo is a tape speed sensor comprising a roll for frictional engagement with the tape, and an encoder for generating pulses indicative of the tape speed. The motor control circuit drives the tape reels at constant speed in response to the speed sensor output pulses.

The tape must of course travel under proper tension between the reels in order to enable the head to correctly write or read data on the tape. To this end the prior art streamer additionally comprises a tension control circuit which affords constant tape tension in the face of varying tape diameters on both reels.

The streaming tape transport of the noted prior art construction has proved to have a weakness in connection with the tape speed control servo. The load on the tape transport mechanism will change abruptly, and the speed sensor will fail to operate normally, when vibrations or shocks are exerted on the device during tape travel at constant speed. The spacings of the tape speed sensor output pulses will unduly extend in such cases, falsely indicating a drop in tape speed.

Heretofore, the motor control circuit has responded to such unduly long pulse spacings by accelerating one of the reel motors. Since such sudden acceleration inevitably involves an overshoot, the motor control circuit has then had to decelerate the motor, resulting in hunting in some cases. The hunting of the tape speed control servo has led in turn to the development of a slack in the tape. The tape on slackening has been easy to be physically destroyed by jamming.

SUMMARY OF THE INVENTION

The present invention seeks to overcome, in tape transports of the type defined, such hunting of the tape speed control servo and further to automatically take up a tape slack by overriding the tape speed control.

Briefly stated in one aspect thereof, the invention pertains to a tape slack takeup method for a tape transport for use with a tape cassette having a length of tape extending between a pair of reels within a housing, wherein the tape transport includes a tape speed control servo for driving a pair of motors in response to a tape speed signal from a tape speed sensor for bidirectional tape transportation between the reels at constant speed. For taking up a slack that may develop in the tape during tape travel under the control of the tape speed control servo, the method dictates to constantly monitor the tape speed signal to detect a slack in the tape of the tape cassette. When a possible tape slack is detected, the tape speed control servo is overridden, and the pair of motors are simultaneously energized for reel rotation in opposite directions, thereby stretching the tape between the pair of reels, until the slack is removed.

Typically, the tape speed signal takes the form of a train of pulses with a recurrence rate proportional to the tape speed. A tape slack is detectable from the tape speed pulses as an abnormal decrease in recurrence rate. Thereupon the tape speed control servo is overridden, and the tape slack is removed automatically. The tape will not jam as the hunting of the tape speed control servo is overcome and the tape slack taken up as above.

Preferably, for taking up a tape slack, the pair of motors may be first energized with a first voltage, which may be the full supply voltage, for a first preassigned length of time and then with a second voltage, lower than the first voltage, for a second preassigned length of time longer than the first preassigned length of time. Further this slack takeup cycle may be repeated two or more times. The tape might be destroyed if the motors were energized with the full supply voltage, but the motors when heavily loaded might fail to rotate if the voltage were too low. An alternate application of high and low voltages has proved to defeat these dangers, making it possible, instead, to positively remove the slack in a minimum of time.

It is also recommended that one or more such slack takeup cycles be followed by a step of stretching the tape taught enough between the pair of cassette reels. The stretching of the tape is possible by energizing the motors with voltages higher than those during the slack takeup cycle or cycles.

Another aspect of the invention concerns a cassette tape transport constructed for carrying the above summarized method into practice. The tape transport according to the invention comprises a pair of motors connected in parallel between a first and a second terminal of power supply means for driving the respective reels of the tape cassette in opposite directions, a voltage control element connected between the first supply terminal and the pair of motors, a pair of switches connected one between each motor and the second supply terminal, tension control means connected between the pair of motors and the second supply terminal, and a tape speed sensor for providing a tape speed signal. Also included is control means connected to the pair of switches for controlling the traveling direction of the tape between the pair of reels, to the speed control element and the tape speed sensor for controlling the speed control element in response to the tape speed signal so as to cause the tape to travel at constant speed between the pair of reels through a tape speed control servo, and to the tension control means for holding the tape under constant tension. The control means is further responsive to the tape speed signal for causing the pair of motors to be simultaneously energized in opposite directions when the tape speed signal indicates a predetermined drop in the traveling speed of the tape. Thus, upon development of a slack in the tape, as manifested by the tape speed signal, the tape speed control servo is overridden, and the slack is taken up automatically.

As has been set forth in connection with the above summarized method of this invention, it is desirable that the slack be taken up by energizing the pair of motors with alternating high and low voltages. The full supply voltage can of course be applied by closing the pair of switches. For the application of a lower voltage the switches may be opened, and the supply voltage may be applied through the tension control circuit means which have greater resistance. Various additional reduced voltages are applicable by controlling the voltage control element, with the switches held open.

In one preferred form of tape transport according to the invention, the control means includes a microcomputer which is factory preprogrammed to include a slack takeup routine incorporating the method of this invention. Constantly monitoring the tape speed signal which is supplied in the form of a pulse train, the microcomputer triggers off the slack takeup routine when a predetermined number of tape speed pulses are produced each with a period exceeding the normal pulse period to a predetermined degree, when no tape speed pulse is produced for a preassigned length of time at the start of, or during, tape travel, as well as when the tape cassette is initially loaded in the tape transport. Tape slacks will thus be removed automatically on all possible occasions where the tape may have slackened.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
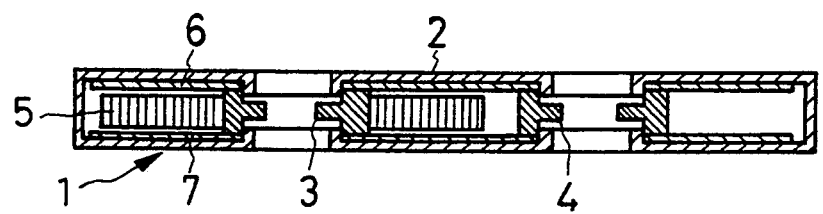
FIG. 1 is a section through the tape cassette for use with the tape transport of this invention.

The tape cassette suitable for use with the streaming tape transport of this invention is shown in section in FIG. 1 and generally designated 1. The tape cassette 1 is of conventional design having a cassette housing 2 of relatively flat boxlike shape within which there are mounted a file reel 3 and a takeup reel 4 for rotation about spaced parallel axes. A length of magnetic tape 5, shown wound on the file reel 3, has its opposite extremities anchored to both reels 3 and 4 and extend therebetween along a predefined path. The cassette housing has a pair of antifriction linings 6 and 7 attached to the insides of its opposite main sides in order to enable the tape 5 to be transported between both reels with a minimum of friction.

Figure 2:
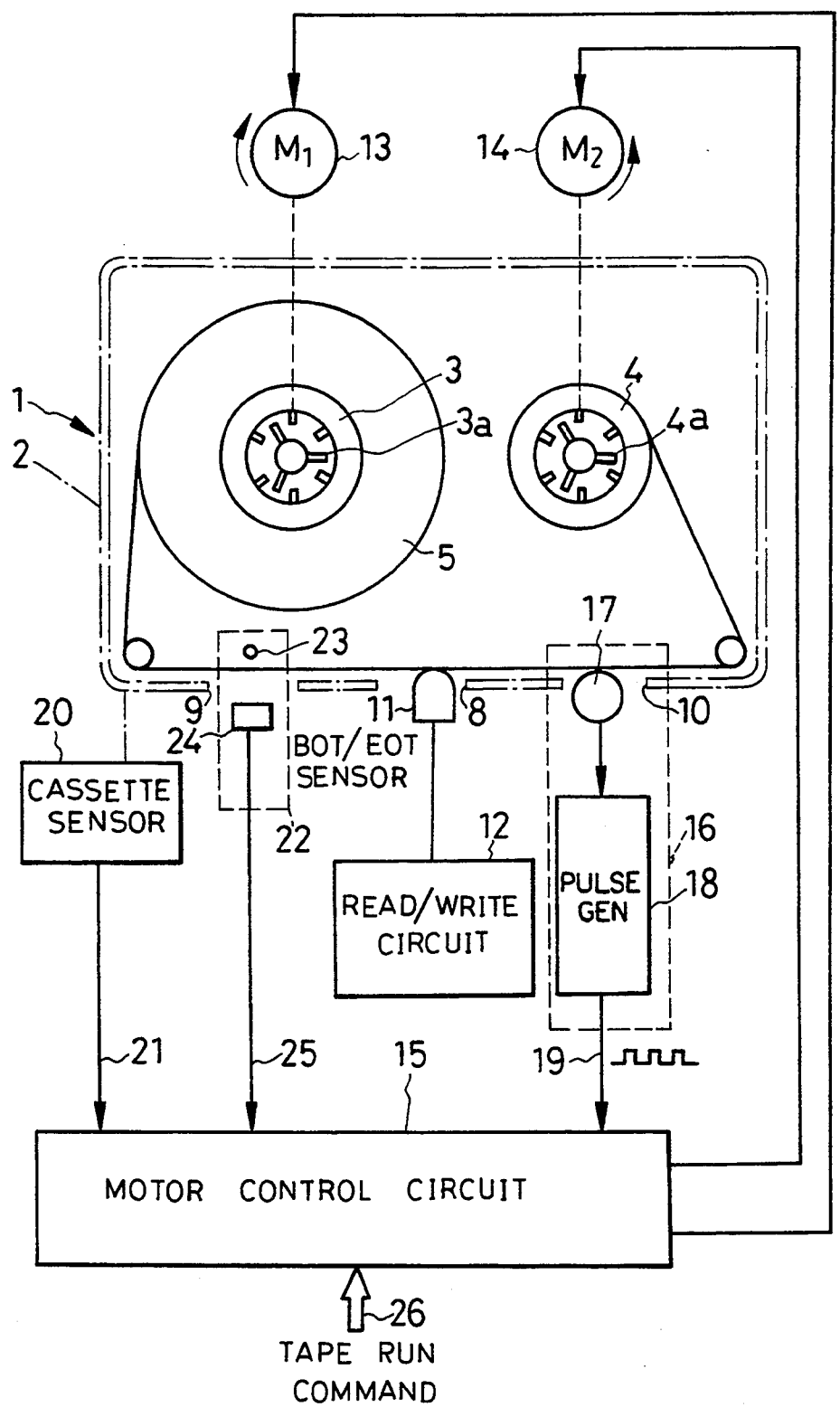
FIG. 2 is a block diagram of the tape transport shown together with the tape cassette loaded in position therein.

In FIG. 2 is shown the tape cassette 1 mounted in position in the tape transport in accordance with the invention. The cassette housing 2 has a window 8 formed centrally in its front edge to expose part of the tape 5 extending between the reels 3 and 4. A magnetic head 11 partly intrudes into the cassette housing 2 through the window 8 for data transfer contact with the tape 5. A read/write circuit 12 of any known or suitable make is coupled to the head 11. The cassette housing 2 has two other windows 9 and 10 formed on both sides of the window 8, for purposes to be set forth presently.

For running the tape 5 between both reels 3 and 4, a pair of electric motors 18 and 14 are provided which have spindles 3a and 4a for driving engagement with the respective reels 3 and 4. The motors 13 and 14 are controllable speed d.c. motors, having their polarities so determined as to rotate in a direction for winding up the tape 5, that is, the first motor 13 in a clockwise direction, as viewed in FIG. 2, and the second motor 14 in a counterclockwise direction.

The motors 13 and 14 are under the control of a tape speed control and slack takeup servomechanism forming the gist of this invention. The servomechanism includes a motor control circuit 15 to which is connected a tape speed sensor 16. As disclosed in Sakai U.S. Pat. No. 4,163,532, supra, the tape speed sensor 18 comprises a roll 17 and a pulse generator or encoder 18. The speed sensor roll 17 makes frictional contact with the tape 5 through the window 10 in the cassette housing 2. As this roll rotates with the travel of the tape 5, the encoder 18 photoelectrically generates a series of tape speed pulses at a recurrence rate proportional with the tape speed. The tape speed pulses are sent over a line 19 to the motor control circuit 15.

Also connected to the motor control circuit 15 is a cassette sensor 20 which senses, either photoelectrically or electromechanically, the loading of the tape cassette 1 in position on the tape transport. The cassette sensor 20 sends its output to the motor control circuit 15 over a line 21.

Additionally, a beginning-of-tape (BOT) and end-of-tape (EOT) sensor 22 is connected to the motor control circuit 15. The sensor 22 detects BOT and EOT marks, not shown, of the tape 5. Typically, the BOT and EOT marks are transparent end zones of the otherwise opaque tape 5. For sensing such transparent end zones, the sensor 22 is shown to comprise a light source 23 and a photodetector 24 disposed opposite each other across the tape 5. The noted window 9 in the cassette housing 2 is utilized toward this end. The BOT and EOT sensor 22 sends its output to the motor control circuit 15 over a line 25.

The motor control circuit 15 is itself under the control of a host system, not shown. The host system supplies a tape run command, forward run command, reverse run command, fast run command, stop command, etc., to the motor control circuit 15 over a bus 26.

Figure 3:
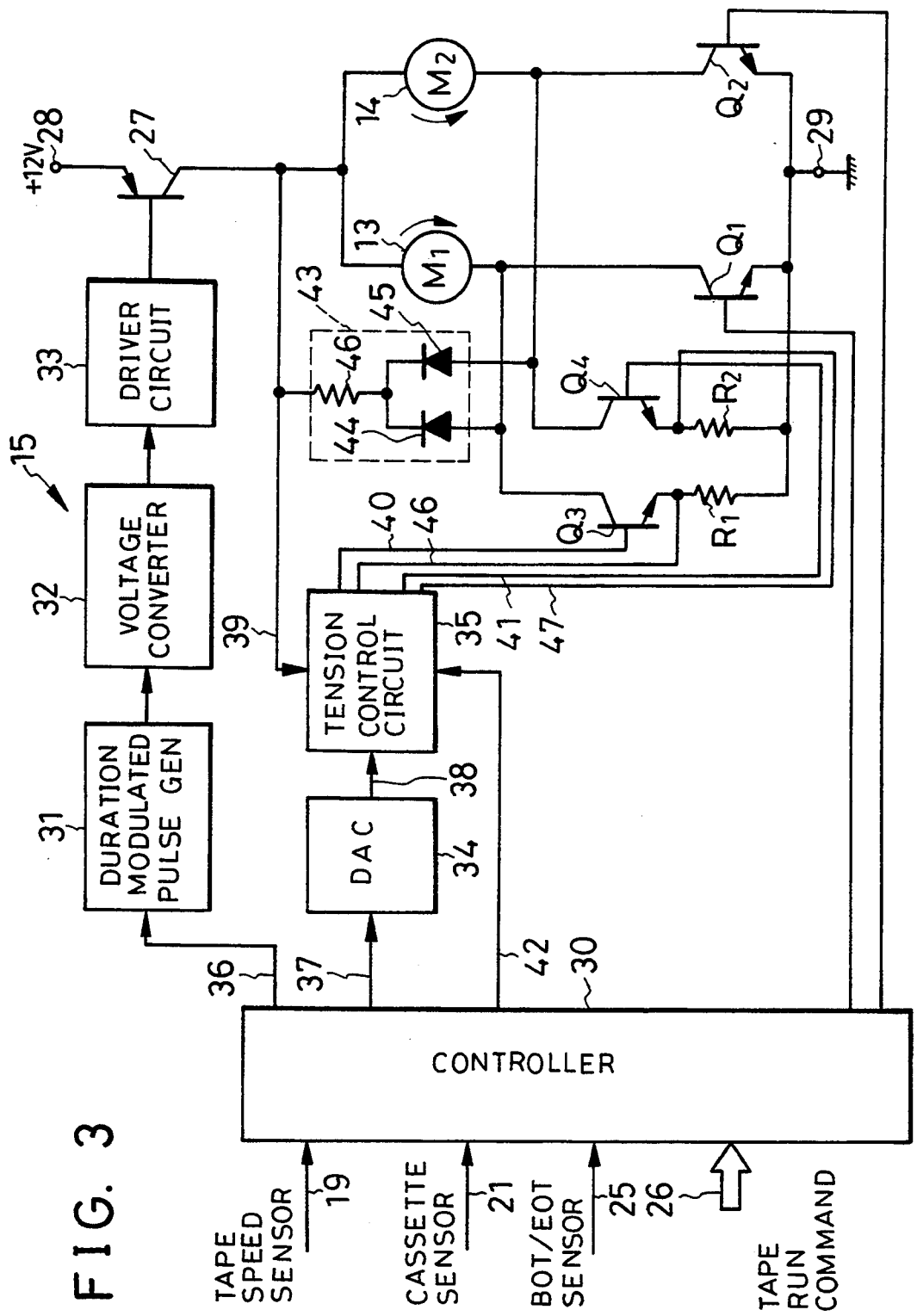
FIG. 3 is a block diagram showing in detail the motor control circuit of the FIG. 2 tape transport.

FIG. 3 shows in detail the motor control circuit 15 together with the motors 13 and 14 and associated circuitry. The motors 13 and 14 are herein connected between a common 12 volts supply terminal 28 and a common ground terminal 29. A single supply voltage control transistor 27 is shown connected between the motors 13 and 14 and the supply terminal 28 for controlling the supply voltage across both motors and hence the traveling speed of the tape 5, although two such transistors could be connected in series with the respective motors for the same purpose. Two switching transistors $Q_1$ and $Q_2$ are connected between the respective motors 13 and 14 and the ground terminal 29. Also, serial circuits of two tape tension control transistors $Q_3$ and $Q_4$ and two resistors $R_1$ and $R_2$ are connected between the respective motors 13 and 14 and the ground terminal 29. The two tension control transistors $Q_3$ and $Q_4$, however, could be replaced by a single transistor connected to both motors via diode switches.

The motor control circuit 15 includes a controller 30, which may take the form of a programmable microcomputer in practice, for controlling the supply voltage control transistor 27, motor switching transistors $Q_1$ and $Q_2$ and tape tension control transistors $Q_3$ and $Q_4$, either directly or indirectly. The controller 30 turns the file reel motor switching transistor $Q_1$ off, and the takeup reel motor switching transistor $Q_2$ on, for forward tape travel from file reel 3 to takeup reel 4, and turns the feel reel motor switching transistor $Q_1$ on, and the takeup reel motor switching transistor $Q_2$ off, for reverse tape travel. However, for taking up a tape slack by a slack takeup program introduced into the controller 30 in accordance with the invention, both switching transistors $Q_1$ and $Q_2$ will be jointly turned on and off. The slack takeup program will be detailed subsequently.

The controller 30 also takes part in the speed control and tension control of the tape 5. First, for tape speed control, the controller 30 is connected to the base of the voltage control transistor 27 via a serial circuit of a duration modulated pulse generator 31, voltage converter 32 and driver circuit 33. For tape tension control, on the other hand, the controller 30 is connected to the bases of the tension control transistors $Q_3$ and $Q_4$ via a serial circuit of a digital to analog converter (DAC) 34 and tension control circuit 35.

During writing or reading, the controller 30 inputs the tape speed pulses over the line 19, determines the traveling speed of the tape from their recurrence rate, and creates speed control data necessary for constant speed tape transportation. The speed control data is supplied over a line 36 to the duration modulated pulse generator 31, which then responds by generating voltage control pulses having their durations modulated accordingly. These pulses have a fixed cycle of sixty-four microseconds but change in duty ratio. The voltage converter 32 translates the incoming duration modulated voltage control pulses into a unidirectional voltage proportional with the pulse durations. Inputting this voltage, the driver circuit 33 causes conduction through the voltage control transistor 27, with the consequent application of a controlled supply voltage to both motors 13 and 14.

The controller 30 also creates slack takeup data and delivers it to the duration modulated pulse generator 31. The duration modulated voltage control pulses generated then will be later explained in detail in the course of the description of the slack takeup program.

For tape tension control the controller 30 creates necessary data based upon the tape diameters on the reels 3 and 4. The tape diameters are determined by counting the tape speed pulses from the moment the BOT or EOT mark is detected by the sensor 22. The controller 30 incorporates a bidirectional counter, not shown, to this end, which counts the tape speed pulses in an increasing direction during forward tape travel and in a decreasing direction during reverse tape travel. The tension control data is sent over a line 37 to the DAC 34.

Inputting the digital tension control data, the DAC 34 delivers an analog equivalent thereof to the tension control circuit 35 over a line 38. This circuit generates tension control signals from the tension control data as well as from a motor voltage signal supplied thereto over a line 39 connected to the circuit point between the voltage control transistor 27 and the motors 13 and 14. The tension control signals are sent over lines 40 and 41 to the bases of the tension control transistors $Q_3$ and $Q_4$. The emitters of these transistors are coupled to the tension control circuit 35 by way of respective lines 46 and 47 for feedback purposes. The controller 30 is also coupled directly to the tension control circuit 35 by way of a line 42 for supplying thereto a signal indicative of a read/write or play mode and a slack takeup mode. This signal will be referred to as the play/slack-takeup mode signal.

Figure 4:
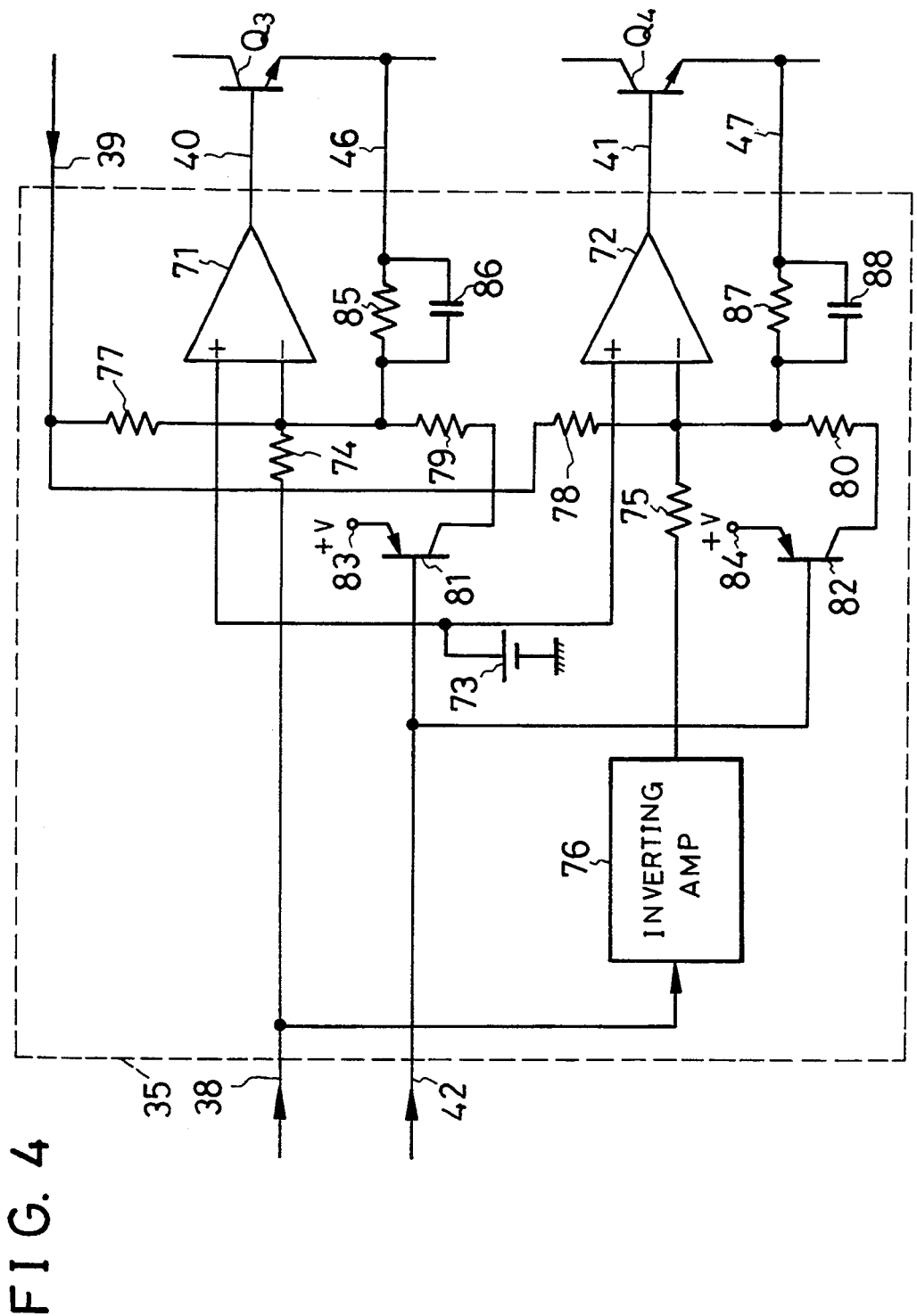
FIG. 4 is a schematic electrical diagram of the tension control circuit included in the FIG. 3 motor control circuit.

As illustrated in detail in FIG. 4, the tension control circuit 35 comprises a first 71 and a second 72 operational amplifier. Both operational amplifiers 71 and 72 have their noninverting inputs connected to a reference voltage source 73, and their outputs to the bases of the respective tension control transistors $Q_3$ and $Q_4$. The inverting input of the first operational amplifier 71 is connected to the DAC output line 38 via a resistor 74. The inverting input of the second operational amplifier 72 is connected to the DAC output line 38 via a resistor 75 and an inverting amplifier 76. Further the inverting inputs of both amplifiers 71 and 72 are connected to the motor voltage signal line 39 via respective resistors 77 and 78.

Still further, for varying the supply voltages across the motors 13 and 14 during constant speed tape travel and during slack takeup, the inverting inputs of tile operational amplifiers 71 and 72 are connected to supply terminals 83 and 84 via resistors 79 and 80 and transistors 81 and 82, respectively. The bases of the transistors 81 and 82 are both connected to the line 42 in order to be controlled by the play/slack-takeup mode signal.

The emitter of the first tension control transistor $Q_3$ is coupled to the inverting input of the first operational amplifier 71 via a parallel connection of resistor 85 and capacitor 86 to form a feedback circuit. The emitter of the second tension control transistor $Q_4$ is likewise coupled to the inverting input of the second operational amplifier 71 via a parallel connection of resistor 87 and capacitor 88 to form a feedback circuit.

The play/slack-takeup mode signal on the line 42 is high in the play mode, holding the transistors 81 and 82 off. Assume that the tape is now traveling forwardly. Then the DAC output dependent upon the tape diameter on the file reel 3 will be sent over the line 38 to the first operational amplifier 71. The output voltage of the first operational amplifier 71 will become lower with a decrease in tape diameter on the file reel 3. The result will be an increase in collector-emitter voltage of the first tension control transistor $Q_3$, resulting in turn in a decrease in voltage across the file reel motor 13. The voltage across the takeup reel motor 14, on the other hand, will become higher with an increase in tape diameter on the takeup reel, so that the voltage applied to the inverting input of the first operational amplifier 71 will increase correspondingly. Thus, in the illustrated embodiment, the tape is held under constant tension by the combination of the motor voltages and the tension control data. The second operational amplifier 72 does not take part in tension control during forward tape travel because then the second tension control transistor $Q_4$ and resistor $R_2$ are short circuited by the takeup reel motor switching transistor $Q_2$.

During reverse tape travel the second operational amplifier 72 does respond to the analog equivalent of the tension control data supplied from the DAC 34 via the inverting amplifier 76. The resulting tension control operation is similar to that during forward tape travel described above.

The play/slack-takeup mode signal on the line 42 is low in the slack takeup mode, causing conduction through the transistors 81 and 82. The output magnitudes of the operational amplifiers 71 and 72 are therefore lower in the slack takeup mode than in the play mode, and so are the voltages across both reel motors 13 and 14. The switching transistors $Q_1$ and $Q_2$ are both jointly turned on and off several times in the slack takeup mode, and while these transistors are off, the supply voltage is impressed to the motors 13 and 14 via the tension control transistors $Q_3$ and $Q_4$ and resistors $R_1$ and $R_2$.

Seen at 43 FIG. 3 is a motor braking circuit. It comprises a resistor 46 connected in parallel with the motors 13 and 14 via respective resistors 44 and 45.

The operation of the illustrated tape transport will first be described in terms of the play mode and then of the slack takeup mode. The tape 5 will be rewound, if necessary, on the file reel 3 until the BOT mark is detected by the BOT and EOT sensor 22 preparatory to running the tape forwardly for writing or reading. Receiving a forward tape run command from the unshown host system over the bus 26, FIG. 3, the controller 30 will respond by causing conduction through the take-up reel motor switching transistor $Q_2$ and nonconduction through the file reel motor switching transistor $Q_1$. Thereupon the takeup reel motor 14 will be set into rotation with the formation of a closed supply circuit comprising the supply terminal 28, voltage control transistors 27, takeup reel motor switching transistor $Q_2$, and ground terminal 29.

As the tape 5 thus starts traveling forwardly, the speed sensor 16 will begin delivering tape speed pulses to the controller 30 over the line 19. The controller 30 will then respond by creating speed control data accordingly, for delivery to the duration modulated pulse generator 31. The duration modulated speed control pulses from the generator 31 will be translated by the voltage converter 32 into an equivalent unidirectional voltage for controlling the collector-emitter resistance of the speed control transistor 27. There is thus completed a tape speed control feedback loop whereby the supply voltage across the takeup reel motor 14 is controlled so as to hold constant the traveling speed of the tape 5.

Tape tension during such forward travel is controlled by energizing the file reel motor 13. The supply voltage across the file reel motor 13 must be varied according to the varying tape diameters on both reels 13 and 14. To this end, as has been stated, the controller 30 ascertains the tape diameters by counting the tape speed pulses and creates tension control data necessary for holding the tape under constant tension in the face of such varying tape diameters. The tension control data is supplied via the DAC 34 to the tension control circuit 35 for controlling the first tension control transistor $Q_3$ accordingly. The tension control circuit 35 relies also on the supply voltage across the takeup reel motor 14 for the determination of the voltage impressed to the first tension control transistor $Q_3$, as has been set forth above.

During reverse tape travel, on the other hand, the file reel motor switching transistor $Q_1$ is on, and the takeup reel motor switching transistor $Q_2$ is off. Tape tension is controlled by the tension control signal supplied as above from the tension control circuit 35 to the base of the second tension control transistor $Q_4$.

The illustrated tape transport is automatically triggered into the slack takeup mode in the following three cases:

1. When the tape cassette 1 is loaded and, at the same time, when the device is powered on.
2. When the speed sensor 16 fails to generate a tape speed pulse for more than a predetermined length of time (e.g. 230 milliseconds) at the start of, or during, tape travel.
3. When a predetermined number (e.g. three) of tape speed pulses are generated consecutively with a cycle exceeding their normal cycle during constant speed tape travel to a predetermined degree (e.g. 1.3 times).

Figure 5:
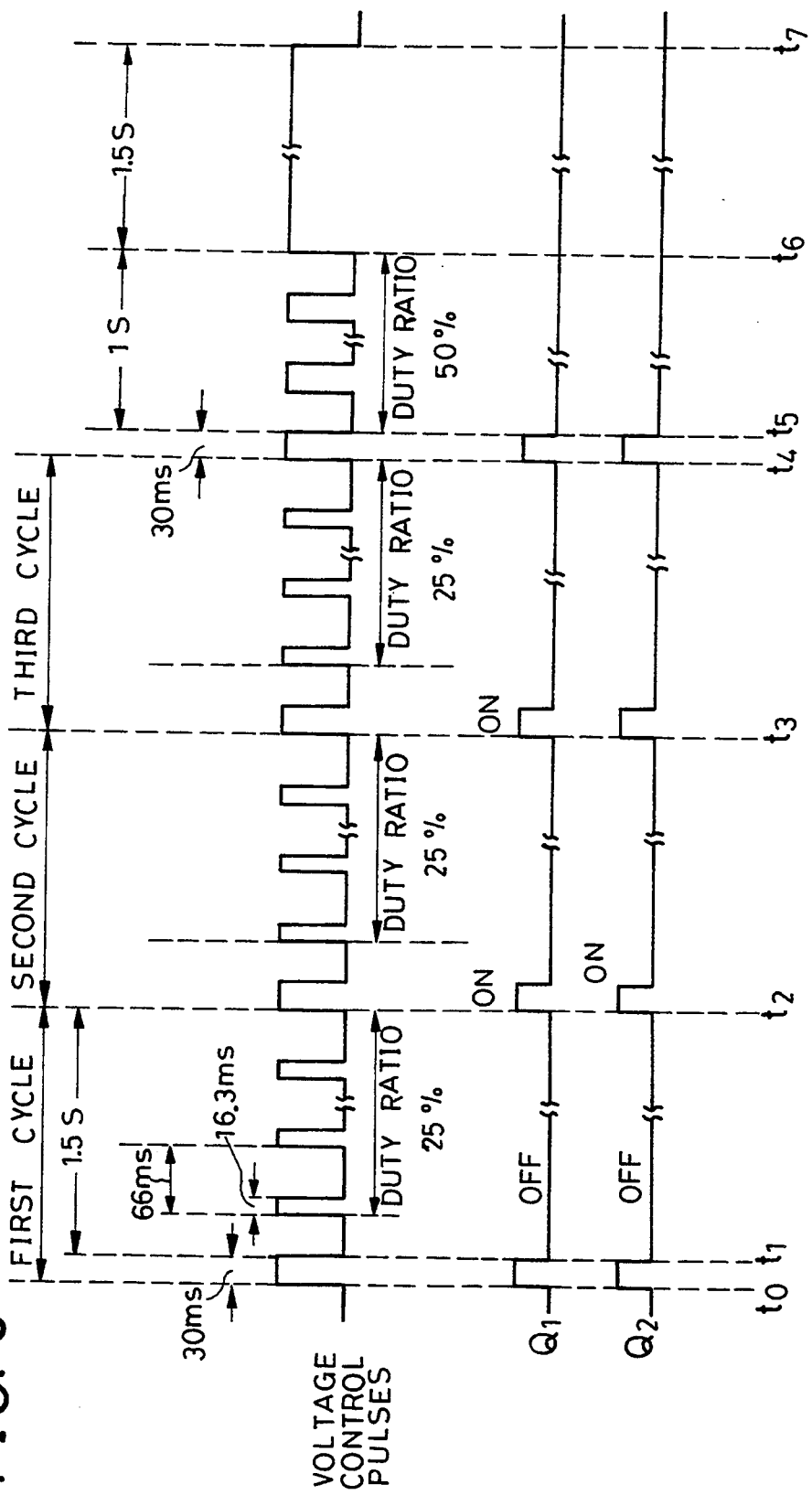
FIG. 5 is a diagram of waveforms appearing in various parts of the FIG. 3 motor control circuit during slack takeup operation.
Figure 6:
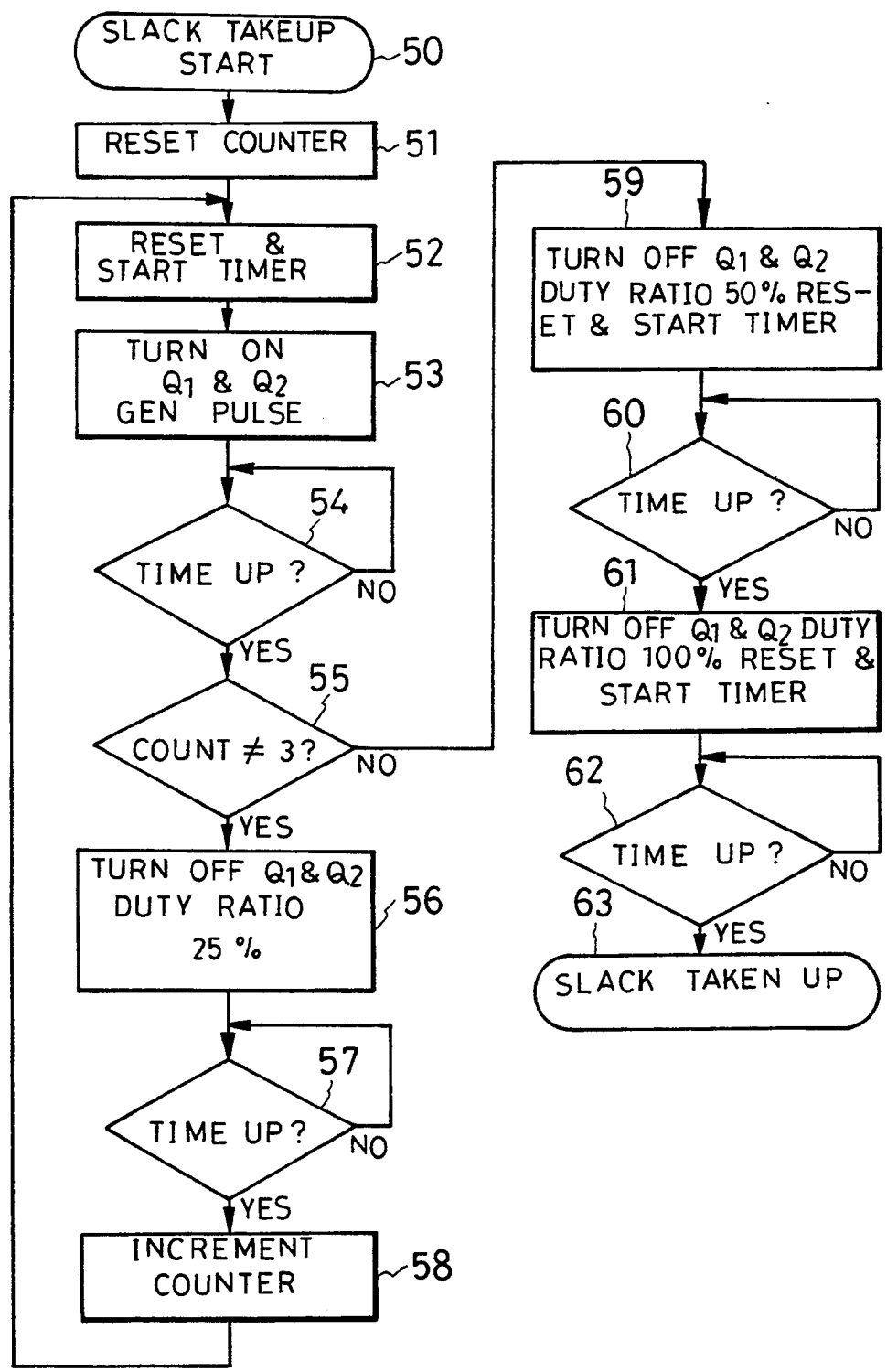
FIG. 6 is a flow chart of the slack takeup routine introduced into the controller of the FIG. 3 motor control circuit.

The following description of slack takeup operation will be better understood by referring to FIGS. 5 and 6. FIG. 5 shows the duration modulated voltage control pulses produced by the pulse generator 31, FIG. 3, and the signals supplied from the controller 30 to the bases of the motor switching transistors $Q_1$ and $Q_2$ during each slack takeup session. FIG. 6 is a flowchart of the slack takeup routine in accordance with the invention which may be factory programmed into the controller 30.

The slack takeup routine starts as at 50 in FIG. 6 when, for example, the loading of the tape cassette 1 is sensed by the cassette sensor 20. Then, at the next block 51, a takeup counter, not shown, is reset which is built into the controller 30 for counting the cycles of slack takeup operation to be set forth subsequently. A timer, not shown, built into the controller 30 is also reset and immediately caused to start measuring time at a block 52. At the next block 53, which is concurrent with the block 52, both motor switching transistors $Q_1$ and $Q_2$ are turned on, and the duration modulated pulse generator 31 is caused to go high and remain so until the timer measures a preassigned brief time of, say, 30 milliseconds at a logical node 54.

The above 30 milliseconds period is depicted in FIG. 5 as from time $t_0$ to time $t_1$. This period is very short compared with the length of time required for taking up the expected maximum take slack by the joint energization of both motors 13 and 14, so much so that the tape will substantially remain loose during the $t_0$-$t_1$ time interval.

Next comes another logical node 55 which questions whether the takeup counter has counted up to three. The count at the time $t_1$ in FIG. 5 is still zero. Therefore, at the next block 56, the switching transistors $Q_1$ and $Q_2$ are both turned off, and the pulse generator 31 is caused to generate duration modulated voltage control pulses at a duty ratio of 25%. The motors 13 and 14 are driven through the circuits comprising the tension control transistors $Q_3$ and $Q_4$ and resistors $R_1$ and $R_2$ for taking up the tape slack when both switching transistors $Q_1$ and $Q_2$ are turned off as above. The cycle of the voltage control pulses may be set at 66 milliseconds in the slack takeup mode, so that the pulses have each a duration of 16.3 milliseconds when their duty ratio is set at 25%.

The conditions set up at the block 56 are maintained 1.5 seconds thereafter, as indicated at a node 57. Then the first cycle of slack takeup operation comes to an end at time $t_2$ in FIG. 5. The takeup counter is therefore incremented to one at a block 58.

The second cycle of slack takeup operation starts as the routine returns from block 58 to block 52. The procedure of 52–57 is then repeated, and the takeup counter is incremented to two at the block 58 when the second cycle is completed at time $t_3$ in FIG. 5.

The third cycle of slack takeup operation is similarly carried out from time $t_3$ to time $t_4$ in FIG. 5. The takeup counter is incremented to three at the end of this third cycle.

It is understood that the tape slack has been fully removed by the foregoing three cycles of takeup operation. Possibly, however, the tape may not yet be stretched tight enough for writing or reading. It is therefore recommended that the tape be tensed following slack removal.

The slack takeup routine temporarily returns to the block 52 upon completion of the third cycle, and another 30 milliseconds is measured by the timer. This 30 milliseconds period is from time $t_4$ to time $t_5$ in FIG. 5, during which the switching transistors $Q_1$ and $Q_2$ are both held on, and the pulse generator 31 is caused to put out a pulse, according to the block 53. At the time $t_5$ the routine branches off from the node 55 to a block 59, at which the switching transistors $Q_1$ and $Q_2$ are turned off. Further, at this block 59, the duty ratio of voltage control pulses is increased to, say, 50%, and the timer is reset and restarted.

One second is measured from the time $t_5$ at a node 60. Then, at a block 61 corresponding to time $t_6$ in FIG. 5, the pulse generator is set for operation with a duty ratio of 100%, and the timer is again reset and restarted, with the switching transistors $Q_1$ and $Q_2$ held off. One and a half seconds is measured from the time $t_6$ at a node 62, whereupon the slack takeup routine comes to an end at 63, and at time $t_7$ in FIG. 5. The total length from time $t_0$ to time $t_7$ is so predetermined that the tape will be freed from the expected maximum slack and subsequently stretched tense enough for the commencement of writing or reading.

A reconsideration of FIG. 5 will reveal that the highest possible drive voltage is applied to the motors 13 and 14 for the first 30 milliseconds of each of the three slack takeup cycles, that is, for 30 milliseconds after the times $t_0$, $t_2$ and $t_3$. The motors can thus be positively started up for taking up the tape slack while being subsequently energized intermittently. A continued application of such highest drive voltage would be undesirable because then the tape might jam and so be destroyed, particularly if it had slackened too much.

Therefore, in the illustrated embodiment, the switching transistors are turned of, and the duty ratio of the duration modulated voltage control pulses is set as low as 25%, after the initial 30 milliseconds of each slack takeup cycle. The motors are thereafter intermittently energized with much lower drive voltages through the circuits comprising the tension control transistors $Q_3$ and $Q_4$ and resistors $R_1$ and $R_2$. An energization of the motors with such reduced voltages alone would also be objectionable because then the slack might not be removed in cases where the motors were heavily loaded. The application of the full supply voltage for the brief periods after the times $t_0$, $t_2$ and $t_3$ is intended to defeat this risk.

After the last application of the full supply voltage during the $t_4$–$t_5$ time interval, the duty ratio of the voltage control pulses is set at 50% and then increased to 100% at the time $t_6$. The tape will thus be gradually stretched out after the slack takeup and held fully taut by the time $t_7$.

The foregoing discussion of the slack takeup routine has presupposed that the controller has invoked it in response to the loading of the tape cassette 1 as sensed by the cassette sensor 20. As has been stated, another justification for initiating the slack takeup routine is an undue decrease in the repetition frequency of the tape speed pulses generated by the speed sensor 16, with the imminent danger of servo hunting. It is therefore recommended that the controller 30 be furnished with the function of constantly monitoring the tape speed pulses for the lengths of their cycles.

Figure 7:
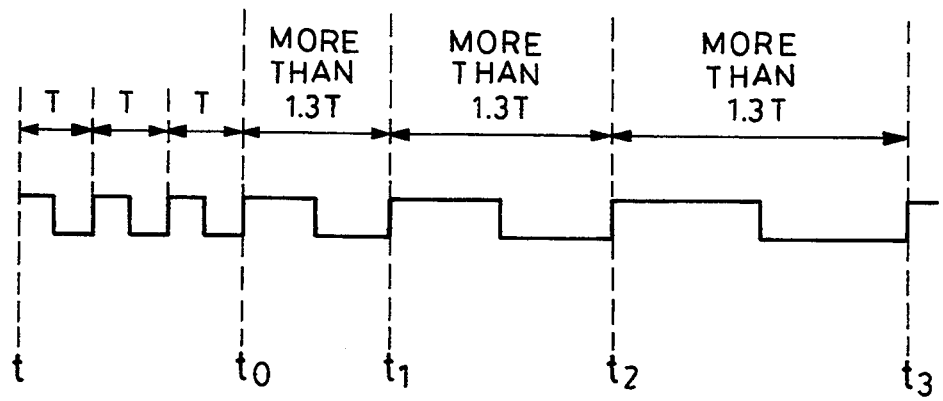
FIG. 7 is a waveform of tape speed pulses, showing one occasion on which the FIG. 6 slack takeup routine is invoked.

As indicated in FIG. 7, the tape speed pulses have a predetermined normal period T before time $t_0$. The periods of the next three a consecutive pulse cycles $t_0$-$t_1$, $t_1$-$t_2$ and $t_2$-$t_3$ are all shown to be more than 1.3 times the normal period T. Thereupon the controller 30 may suspend the play mode and trigger off the slack takeup routine of FIG. 6.

Still another justification for the slack takeup routine is the non-production of tape speed pulses for a prolonged period of time at the starting period of, or during, tape travel. Then the motor control circuit will conventionally function to increase the motor drive voltage and, in event no tape speed pulse is nevertheless produced, to set the motors out of rotation. An objection to this practice is that the supply side reel may continue rotation by inertia, possibly producing a great deal of tape slack.

The present invention therefore suggests to start the slack takeup routine in the case where the tape speed sensor produces no pulse for 230 milliseconds. The tape slack, no matter how long it may be, will be smoothly and thoroughly taken up as the motors are energized in opposite directions with well calculated voltages during the progress of the slack takeup operation.

Despite the foregoing detailed disclosure, it is not desired that the invention be limited by the exact showing of the drawings or the description thereof. For example, instead of providing the duration modulated pulse generator 31 and voltage converter 32 shown in FIG. 8, the tape speed pulses could be directed into a frequency to voltage converter to form the supply voltage control signal. Also, instead of directly measuring the traveling speed of the tape by the tape speed sensor 16, the tape speed could be obtained by measuring the speed of rotation of either or both of the cassette reel drive spindles 3a and 4a, although in this case the output from the spindle speed sensor or sensors must be amended according to tape diameters on both reels to provide a signal representative of the traveling speed of the tape.

All these and other modifications, alterations or adaptations of the illustrated embodiment within the usual knowledge of those skilled in the art are considered to fall within the scope of the invention as expressed in the claims which follow.

What is claimed is:

1. In a tape transport for use with a tape cassette having a length of tape extending between a pair of reels within a housing, wherein the tape transport includes a tape speed control servo for driving a pair of motors in response to a tape speed signal from a tape speed sensor for bidirectional tape transportation between the reels at constant speed, a method of taking up a slack that may develop in the tape during tape travel under the control of the tape speed control servo, which method comprises;
- (1) constantly monitoring the tape speed signal to detect a slack in the tape of the tape cassette;
- (2) overriding the tape speed control servo when a tape slack is detected from the tape speed signal; and
- (c) simultaneously energizing the pair of motors for a preassigned length of time for rotating the pair of reels in the opposite directions so as to remove the tape slack;

wherein the tape slack is removed by at least one slack takeup cycle comprising:
- (a) simultaneously energizing the pair of motors with a first voltage for a first preassigned length of time; and
- (b) simultaneously energizing the pair of motors with a second voltage, lower than the first voltage, for a second preassigned length of time longer than the first preassigned length of time.

2. The tape slack takeup method of claim 1 further comprising a step of tensing the tape between the pair of reels after the slack takeup cycle.

3. The tape slack takeup method of claim 2 wherein the tape is tensed by:
- (a) simultaneously energizing the pair of motors with the first voltage for the first preassigned length of time;
- (b) simultaneously energizing the pair of motors with a third voltage, lower than the first voltage and higher than the second voltage, for a third preassigned length of time; and
- (c) simultaneously energizing tim pair of motors with a fourth voltage, lower than the first voltage and higher than the third voltage, for a fourth preassigned length of time.

4. In a tape transport for use with a tape cassette having a length of tape extending between a pair of reels within a housing, wherein the tape transport has a pair of motors for driving the respective reels in opposite directions and hence for causing the tape to travel bidirectionally therebetween, a method of taking up a slack that may develop in the tape, which method comprises:
- (a) predefining a set of conditions in which the tape may have a slack;
- (b) when any of the predefined conditions is met, simultaneously energizing the pair of motors with a first voltage for a first preassigned length of time for rotating the pair of reels in the opposite directions;
- (c) simultaneously energizing the pair of motors with a second voltage, lower than the first voltage, for a second preassigned length of time for rotating the pair of reels in the opposite directions; and
- (d) repeating the steps (b) and (c) a predetermined number of times.

5. The tape slack takeup method of claim 4 further comprising a step of tensing the tape between the pair of reels after the tape slack has been removed by the repetition of the steps (b) and (c) of claim 4.

6. The tape slack takeup method of claim 5 wherein the set of conditions comprise:
- (a) the loading of the tape cassette in the tape transport;
- (b) the nonproduction of tape speed pulses from a tape speed sensor, included in the tape transport, for a preassigned length of time; and
- (c) the production of a predetermined number of consecutive tape speed pulses by the tape speed sensor which have each a period exceeding a normal period of each tape speed pulse to a predetermined degree.

* * * * *